(12) United States Patent
Sharma et al.

(10) Patent No.: US 10,796,579 B2
(45) Date of Patent: Oct. 6, 2020

(54) METHOD, ELECTRONIC APPARATUS, AND SYSTEM OF SHARING VEHICLE PERFORMANCE INFORMATION AMONG VEHICLES

(71) Applicant: SAMSUNG ELECTRONICS CO., LTD., Suwon-si (KR)

(72) Inventors: Harit Sharma, Bareilly (IN); Ankit Jain, Thane (IN); Abhilash Srivastava, Rihand Nagar (IN); Nabeel Mohamed Chemnad Lasyath, Kasaragod (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 358 days.

(21) Appl. No.: 15/881,349

(22) Filed: Jan. 26, 2018

(65) Prior Publication Data
US 2018/0218609 A1    Aug. 2, 2018

(30) Foreign Application Priority Data
Jan. 27, 2017   (IN) .............................. 201741003147

(51) Int. Cl.
*G08G 1/16*   (2006.01)
*H04L 29/08*   (2006.01)
(Continued)

(52) U.S. Cl.
CPC ............ *G08G 1/163* (2013.01); *G08G 1/012* (2013.01); *G08G 1/0112* (2013.01); *G08G 1/0965* (2013.01); *G08G 1/166* (2013.01); *G08G 1/22* (2013.01); *H04L 67/12* (2013.01); *G06Q 50/30* (2013.01)

(58) Field of Classification Search
CPC ..................................................... G08G 1/163
See application file for complete search history.

(56) References Cited

U.S. PATENT DOCUMENTS

| 9,104,535 B1 | 8/2015 | Brinkmann et al. |
| 9,147,353 B1 | 9/2015 | Slusar |
| (Continued) | | |

FOREIGN PATENT DOCUMENTS

| EP | 2 413 293 A1 | 2/2012 |
| WO | 2016158223 A1 | 10/2016 |
| WO | 2016186719 A1 | 11/2016 |

OTHER PUBLICATIONS

International Search Report (PCT/ISA/210) dated May 18, 2018, issued by the International Searching Authority in International Application No. PCT/KR2018/001117.
(Continued)

*Primary Examiner* — Alex C Dunn
(74) *Attorney, Agent, or Firm* — Sughrue Mion, PLLC

(57) ABSTRACT

A method, electronic apparatus, and system of sharing vehicle performance information are provided, the method includes receiving the vehicle performance parameter by a primary vehicle from a neighboring secondary vehicle in a vicinity to the primary vehicle, analyzing the vehicle performance parameter from the neighboring secondary vehicle in comparison with the corresponding vehicle performance parameter of the primary vehicle, and providing a response based on a result of the analysis of the vehicle performance parameter of the primary vehicle and the neighboring secondary vehicle.

18 Claims, 14 Drawing Sheets

(51) Int. Cl.
    *G08G 1/00*          (2006.01)
    *G08G 1/01*          (2006.01)
    *G08G 1/0965*       (2006.01)
    *G06Q 50/30*        (2012.01)

(56) References Cited

U.S. PATENT DOCUMENTS

| | | |
|---|---|---|
| 9,511,778 B1 | 12/2016 | Fuentes |
| 9,783,159 B1 * | 10/2017 | Potter .................... B60W 40/09 |
| 10,029,696 B1 * | 7/2018 | Ferguson ............... B60W 40/09 |
| 10,176,524 B1 * | 1/2019 | Brandmaier ............ G06Q 40/08 |
| 10,252,716 B2 | 4/2019 | Minemura et al. |
| 10,395,332 B1 * | 8/2019 | Konrardy .............. G06F 16/909 |
| 10,417,714 B1 * | 9/2019 | Christensen .......... H04W 4/029 |
| 2006/0161315 A1 | 7/2006 | Lewis et al. |
| 2010/0250021 A1 * | 9/2010 | Cook ..................... G07C 5/085 |
| | | 701/1 |
| 2018/0118203 A1 | 5/2018 | Minemura et al. |

OTHER PUBLICATIONS

Written Opinion (PCT/ISA/237) dated May 18, 2018, issued by the International Searching Authority in International Application No. PCT/KR2018/001117.
Communication dated Nov. 14, 2019, issued by the European Patent Office in counterpart European Application No. 18744666.1.

\* cited by examiner

FIG. 6
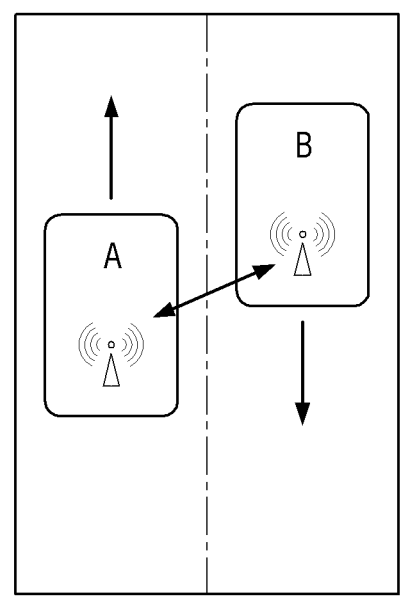
| Parameter | A | B |
|---|---|---|
| Price: | $1,000 | $700 |
| Tank capacity: | 17gal | 11gal |
| Model: | 2F | 4F |

FIG. 7
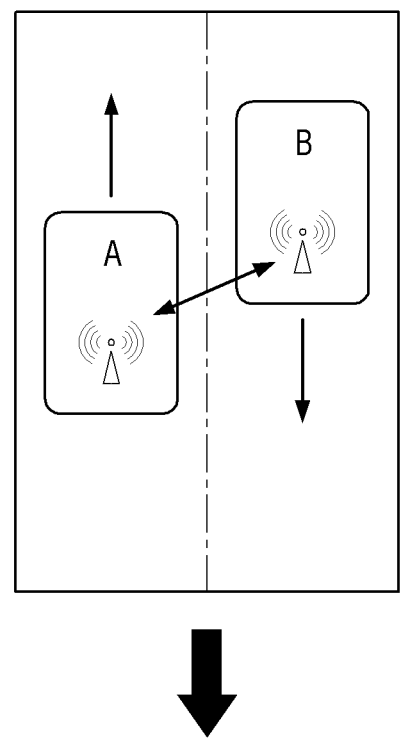
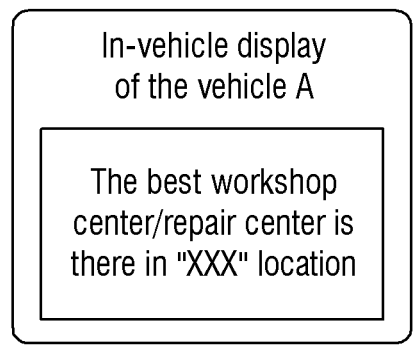

METHOD, ELECTRONIC APPARATUS, AND SYSTEM OF SHARING VEHICLE PERFORMANCE INFORMATION AMONG VEHICLES

CROSS-REFERENCE TO RELATED APPLICATION

This application claims the priority from Indian Patent Application No. 201741003147, filed on Jan. 27, 2017 in the Indian Intellectual Property Office, the entire disclosure of which is incorporated by reference herein.

BACKGROUND

1. Field

Example embodiments of the present disclosure relate to a vehicle-to-vehicle communication, and more specifically to a method, electronic apparatus, and system for sharing vehicle performance information among vehicles.

2. Description of the Related Art

Individual drivers may have a particular driving style based on their skills and experiences. The driving style of the driver may directly affect performance (e.g., fuel consumption, emission rate, any wear or damage) of the driver's vehicle. The vehicle performance is generally seen in terms of absolute standard figures defined by either an original equipment manufacturer (OEM) or a relevant standard body. An absolute standard value of the vehicle is generally referred by a vehicle maintenance expert, which may vary for different OEMs with vehicle design, but may not provide meaningful information that may be understood by the user/driver of the vehicle.

An environment in which the vehicle is driven may also influence the vehicle performance (health). In an example, because a road infrastructure quality may vary in different regions, the absolute standard measurement for the vehicle performance may not be used as a benchmark in the regions where a road surface is rougher and below average quality, such as being damaged or less smooth. In another example, a vehicle driven in urban roads may affect a component (e.g., engine or the like) of the vehicle, and may influence the performance of the vehicle. Hence, the absolute standard measurement for the component of the vehicle performance may not be used as a benchmark in the urban environment.

As such, there is a need to provide information that a user/driver of a vehicle may more easily understand based on the driving environment of the vehicle.

SUMMARY

One or more example embodiments provide a method, electronic apparatus, and system of sharing vehicle performance information among vehicles.

One or more example embodiments also provide a method, electronic apparatus, and system in which a primary vehicle receives a vehicle performance parameter from a neighboring secondary vehicle in a vicinity to the primary vehicle is received.

One or more example embodiments also provide a method, electronic apparatus, and system in which the vehicle performance parameter received from a neighboring secondary vehicle is analyzed in comparison with a corresponding vehicle performance parameter of the primary vehicle.

One or more example embodiments also provide a method, electronic apparatus, and system in which a response upon analyzing the vehicle performance parameter of a primary vehicle and a neighboring secondary vehicle is provided.

According to an aspect of an example embodiment, there is provided an electronic apparatus provided in a vehicle, the electronic apparatus including a communication interface, a memory, a processor connected to the communication interface and the memory, wherein the processor is configured to execute processor-executable instructions stored in the memory to receive at least one vehicle performance parameter of an external vehicle from the external device via the communication interface, analyze the v vehicle performance parameter of the external vehicle received in comparison with a vehicle performance parameter of the vehicle, and provide a response based on a result of the analysis.

The at least one vehicle performance parameter may include at least one from among a component associated with a vehicle, an attribute associated with the component associated with a vehicle, an external factor influencing a vehicle, and a maintenance score associated with a vehicle.

The processor may be further configured to receive the at least one vehicle performance parameter of the external vehicle from the external vehicle via the communication interface in response to a user query being received by the electronic apparatus.

The processor may be further configured to analyze a vehicle performance parameter corresponding to the user query from among the at least one vehicle performance parameter of the external vehicle, and provide a response corresponding to the user query.

The processor may be further configured to retrieve at least one vehicle performance parameter from an external entity.

The processor is further configured to analyze the at least one vehicle performance parameter based on at least one from among a position and a driving direction of the vehicle.

The electronic apparatus may further include a display, and the processor may be further configured to provide the response via the display.

The processor may be further configured to generate a notification to control an external device based on the result of the analysis, and provide the notification via the display.

The processor may be further configured to receive driver information of a driver of the external vehicle via the communication interface, and provide a response based on at least one from among information corresponding to driving habits of the driver of the external vehicle among the at least one vehicle performance parameter and the driver information of the external vehicle, wherein the driving habits include at least one from among information of the number of times of sudden start and sudden brake, information of braking distance, information of fuel efficiency, and the driver information includes at least one from among driving experience of the driver, age of the driver, gender of the driver, drunk driving record of the driver, and accident record of the driver.

According to another aspect of an example embodiment, there is provided a method of controlling an electronic apparatus provided in a vehicle, the method including receiving at least one vehicle performance parameter of an external vehicle from the external vehicle via a communication interface of the electronic apparatus, analyzing the at least one vehicle performance parameter of the external vehicle received in comparison with a vehicle performance parameter of the vehicle, and providing a response based on a result of the analyzing.

The at least one vehicle performance parameter may include at least one from among a component associated with a vehicle, an attribute associated with a component associated with a vehicle, an external factor influencing a vehicle, and a maintenance score associated with a vehicle.

The receiving may further include receiving the at least one vehicle performance parameter of the external vehicle from the external vehicle via the communication interface in response to a user query being received.

The providing may further include providing a response corresponding to the user query based on a result of analyzing a vehicle performance parameter corresponding to the user query from among the at least one vehicle performance parameter of the external vehicle.

The method may further include retrieving at least one vehicle performance parameter from an external entity.

The analyzing may include analyzing the at least one vehicle performance parameter based on at least one from among a present position of the vehicle and a driving direction of the vehicle.

The providing may further include providing the response based on the result of the analyzing via a display.

The providing may further include generating a notification to control an external device based on the result of the analyzing, and providing the notification via the display.

The receiving may further include receiving driver information of a driver of the external vehicle along with the at least one vehicle performance parameter, and the providing may further include providing a response based on information corresponding to driving habits of the driver of the external vehicle among the at least one vehicle performance parameter and the driver information of the external vehicle, wherein the driving habits include at least one from among information of the number of times of sudden start and sudden brake, information of braking distance, information of fuel efficiency, and the driver information includes at least one from among driving experience of the driver, age of the driver, gender of the driver, drunk driving record of the driver, and accident record of the driver.

The memory may be configured to store the at least one vehicle performance parameter of the external vehicle received.

The external entity may include at least one from among a social network service, an external server, and a cloud server.

BRIEF DESCRIPTION OF DRAWINGS

The above and/or other aspects will become more apparent and better understood from the following description of example embodiments with reference to the accompanying drawings, in which:

FIG. 6 is an example illustration of comparison of vehicle performance information of two vehicles according to an example embodiment;

FIG. 7 is an example illustration of displaying a message on an in-vehicle display of a vehicle based on shared vehicle performance information according to an example embodiment;

DETAILED DESCRIPTION

Figure 1A:
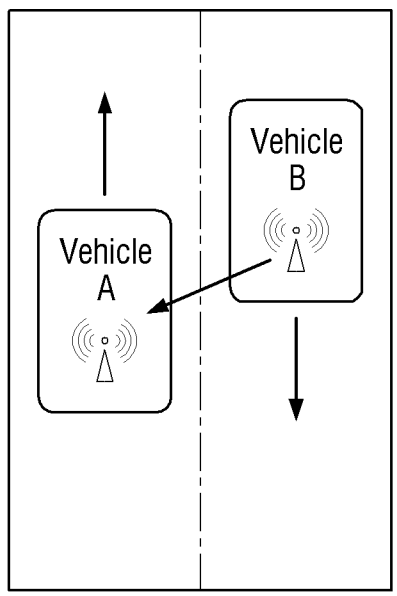
FIGS. 1A, 1B, and 1C illustrate example diagrams of exchanging vehicle performance information among vehicles while driving according to example embodiments.

Hereinafter, example embodiments are explained more fully with reference to the non-limiting example embodiments that are illustrated in the accompanying drawings. Descriptions of well-known components and processing techniques are omitted so as to not unnecessarily obscure the embodiments herein. Also, the various example embodiments described herein are not necessarily mutually exclusive, as some example embodiments can be combined with one or more other example embodiments to form example embodiments. These example embodiments are described in sufficient detail to enable those skilled in the art to practice the present disclosure, and it is to be understood that the example embodiments are not intended to limit the present disclosure to particular modes of practice, and it is to be appreciated that all modification, equivalents, and alternatives that do not depart from the spirit and technical scope of the present disclosure are encompassed in the present disclosure.

Like reference numerals or symbols shown in the drawings of the present disclosure indicate components or components that perform substantially the same function.

Throughout the specification, it will be understood that when a part "includes" or "comprises" an element, unless otherwise defined, the part may further include other elements, not excluding the other elements. It will be further understood that the singular forms "a," "an," and "the" include plural referents unless the context clearly dictates otherwise.

As used herein, the term "and/or" includes any and all combinations of one or more of the associated listed items. Expressions such as "at least one of" or "at least one from among" when preceding a list of elements, modify the entire list of elements and do not modify the individual elements of the list. For example, the expression, "at least one from among a, b, and c," should be understood as including only a, only b, only c, both a and b, both a and c, both b and c, or all of a, b, and c.

Example embodiments may be described and illustrated in terms of blocks which carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hardwired circuits, or the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a combination of dedicated hardware to perform some functions of the block and a processor to perform other functions of the block. Each block of example embodiments may be physically separated into two or more interacting and discrete blocks without departing from the scope of the present disclosure. Likewise, the blocks of the example embodiments may be physically combined into more complex blocks without departing from the scope of the present disclosure.

The terms "vehicle performance information" and "vehicle performance parameter" are used interchangeably in the present disclosure.

Example embodiments herein provide a method of sharing vehicle performance information. The method includes receiving the vehicle performance parameter from a neighboring secondary vehicle in vicinity by a primary vehicle. Further, the method includes relatively analyzing the vehicle performance parameter from the neighboring secondary vehicle with the corresponding vehicle performance parameter of the primary vehicle. Furthermore, the method includes providing a response upon analyzing the vehicle performance parameter of the primary vehicle and the neighboring secondary vehicle.

Unlike conventional methods, the method according to an example embodiment may include comparing the vehicle performance parameter between the vehicles shared anonymously among the vehicles in the vicinity. The method according to an example embodiment may include identifying the suitability of the driving vehicle in a specific region (e.g., typical road conditions or the like) by analyzing the vehicle performance parameter from the vehicle in the vicinity. The vehicle performance parameter relative analysis response may provide quality statistics that may be more easily understood by a user compared to an absolute vehicle performance standard figures defined by a standard organization or an OEM.

The vehicle performance parameter analysis result may assist a user (e.g., driver, owner or the like) to detect the current state of vehicle and decide components associated with the vehicle that needs immediate attention/maintenance or a full service. The vehicle performance parameter analysis result may assist the user to maintain the vehicle at a level with respect to other vehicle in a same region.

Along with the vehicle performance parameter analysis response, a service vendor information may also be exchanged to help other drivers and/or the sender in choosing the best or more suitable repair/maintenance workshops. The vehicle performance parameter analysis result along with the driving behavior may provide approximate skill measurement of the driver with higher accuracy. The vehicle performance parameter analysis result may assist the fleet vendor to maintain a basic threshold for performance statistics (e.g., efficiency or performance) for vehicles.

In an example embodiment, the vehicle performance parameter analysis response may be shared over social media.

Example embodiments herein discloses a system of exchanging vehicle performance information among vehicles. The system may include a first set of vehicles and second set of vehicles configured to exchange vehicle performance parameter associated with the first set of vehicles and the second set of vehicles in the vicinity, relatively analyze the vehicle performance parameter with corresponding vehicle performance parameter of the first set of vehicles and the second set of vehicles; and provide a response upon analyzing the vehicle performance parameter in the first set of vehicles and the second set of vehicles.

Figure 1B:
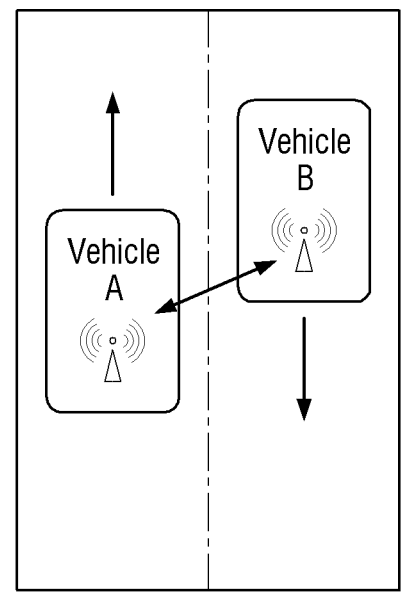
Figure 1C:
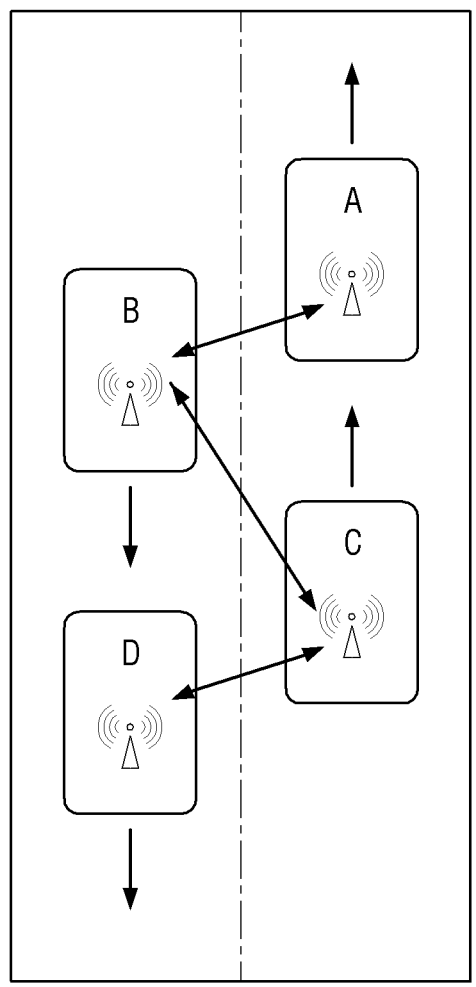

FIGS. 1A, 1B, and 1C show example diagrams of exchanging vehicle performance information among vehicles while driving according to example embodiments. The environment may include a primary vehicle (vehicle A) and the neighboring secondary vehicle (vehicle B).

In an example embodiment, the primary vehicle and the secondary vehicle may belong to same OEM, but example embodiments are not limited thereto. For example, the primary vehicle and the secondary vehicle may belong to different OEMs.

The primary vehicle may detect a neighboring secondary vehicle in a vicinity of the primary vehicle by using a communication interface. The communication interface may support a Long Term Evolution (LTE) communication, a Wireless Fidelity (Wi-Fi), or other communication standards/protocols. After detecting the neighboring secondary vehicle, the primary vehicle may receive the vehicle performance parameter of the neighboring secondary vehicle.

In an example, the vehicle performance parameter may correspond to, for example, a component associated with the primary vehicle and the neighboring secondary vehicle, an attribute associated with the component, an external factor influencing the primary vehicle and the neighboring secondary vehicle, and a maintenance score associated with the primary vehicle and the neighboring secondary vehicle or combination thereof.

The component may be, for example but not limited to, an engine control system, an electrical system, suspension, a steering system, a braking system, an engine, a drive train, heating, ventilation, and air conditioning (HVAC) system, a window, a seat, a fuel filter, a spark plug, a rubber bushing, a gear box, a brake rotor, a wiper blade, a tire, a door or the like.

The attribute may be, for example but not limited to, a vehicle acceleration, a vehicle deceleration, a wheel rotation, a wheel speed, a wheel revolutions-per-minute, a wheel slip, a current activation state of a power source activation/deactivation switching unit, a current deactivation state of the power source activation/deactivation switching unit, a current setting of a transmission part, a gear selection setting, a current state of a braking system, a seat setting, an exterior sound receiver function, an interior sound receiver function, a current state of a vehicular safety system, an air bag setting, an emergency brake pedal setting, a door setting, an engine temperature level, a passenger compartment temperature level, a braking distance, a fuel efficiency, a coolant temperature rise, an ignition timing, a cabin temperature level, a window setting, or the like.

The external factor influencing the vehicle performance and also the input for relative vehicle performance analysis may be, for example but not limited to, a higher ground clearance more suitable for the vehicle in rocky and off-road surface, a lower ground clearance allowing better handling and providing a performance benefit on a smooth road surface, a low turning radius of the vehicle helping to drive through a city traffic, a smaller braking distance reducing the risk of collision in the hilly regions, an asymmetrical tread patterns providing maximum grip on a road and more appropriate for maximum cornering on dry surfaces, higher horsepower more suitable for higher speed and higher torque to support longer runs, a climate in a region which affects the viscosity of engine oil, traction control and all-wheel drive ensuring increased safety on snowy roads and off-road capabilities of vehicle in deserts, or the like.

In an example embodiment, the maintenance score may be obtained based on the primary vehicle usage pattern or the neighboring secondary vehicle usage pattern.

In an example embodiment, the maintenance score may be obtained based on latest historical information of the primary vehicle or latest historical information of the neighboring secondary vehicle.

As shown in the FIG. 1A, when the primary vehicle (vehicle A) receives the vehicle performance parameter from the neighboring secondary vehicle (vehicle B), the primary vehicle may relatively analyze the vehicle performance parameter of the neighboring secondary vehicle in comparison with the corresponding vehicle performance parameter of the primary vehicle. Upon analyzing the vehicle performance parameter, the primary vehicle may provide the response.

In an example embodiment, the primary vehicle may relatively analyze the vehicle performance parameter of the neighboring secondary vehicle with the corresponding vehicle performance parameter of the primary vehicle based on a present position in the driving direction of the primary vehicle.

In an example embodiment, the primary vehicle may relatively analyze the vehicle performance parameter of the neighboring secondary vehicle with the corresponding vehicle performance parameter of the primary vehicle based on a road condition, such as, an urban road, a national highway road, or the like.

In an example embodiment, the vehicle performance parameter may be exchanged between the primary vehicle (vehicle A) and the neighboring secondary vehicle (vehicle B) as shown in the FIG. 1B. The primary vehicle and the neighboring secondary vehicle may be travelling in the different directions.

In an example embodiment, the vehicle performance parameter may be exchanged between multiple vehicles while driving, where all the vehicles are in the vicinity as shown in the FIG. 1C.

In an example embodiment, the vehicle performance parameter may be exchanged between multiple vehicles in a parking area, where all the vehicles are in vicinity.

In an example embodiment, the vehicle performance parameter may be exchanged between multiple vehicles in vicinity when the vehicles moving in different directions, but example embodiments are not limited thereto. For example, the vehicle performance parameter may be exchanged between multiple vehicles in vicinity when the vehicles are moving in same direction.

In an example embodiment, the response may correspond to an action or suggestion related to the primary vehicle or the secondary vehicle. In an example, the action may be an estimation of vehicle performance, a maintenance action or the like. In an example, the maintenance includes oil change, washer fluid change, windshield wiper change, tire change or the like.

In an example embodiment, the response may correspond to a notification, for example, scheduled maintenance reminder, discounts on all scheduled maintenance, scheduled maintenance, vehicle registration renewal, vehicle safety/smog inspection renewal, a call for roadside assistance, fleet management, or the like.

In an example embodiment, the response may be transferred to the electronic device held by the user (e.g., driver, owner, or the like) of the primary vehicle. The electronic device may be a smart phone, a laptop, a personal digital assistant (PDA), a tablet computer or the like.

In an example embodiment, the response may be displayed on an in-vehicle display of the primary vehicle or the neighboring secondary vehicle.

In an example embodiment, the notification may be sent to, for example, an authorized user of the vehicle, a maintenance provider, an insurance provider and/or an emergency agency.

In an example embodiment, the response may be dynamically provided based the present position of the vehicle. The present position corresponds to the current road condition or current driving direction of the vehicle. In an example, the vehicle may have been previously used in the hilly area, and may travel to a city area. In this case, based on the city road condition, the response may be provided to the user.

In an example embodiment, the response may be synchronized with a calendar application in an electronic device of the user, which may alerts the user to better maintain operations of the vehicle.

In an example embodiment, the vehicle performance parameter may be analyzed based on the location of the primary vehicle.

In an example embodiment, the vehicle performance parameter of the neighboring secondary vehicle may be received based on an event. In an example, the event may be a trip plan providing destination, vehicle service or the like.

In an example embodiment, the response may be provided based on a query received from the user.

In an example embodiment, the vehicle performance parameter may be retrieved from an external entity. The external entity may be, for example but not limited to social media, a dedicated server monitoring vehicle performance information of vehicles in a city/state, a cloud server with vehicle information of vehicles or the like.

In an example embodiment, driving characteristics may also be identified by relatively comparing a driving information of the primary vehicle with the driving information of the neighboring secondary vehicle. Based on the driving characteristics, the user (i.e., driver, owner, or the like) of the vehicle may identify a driver for the user's own vehicle.

Figure 2:
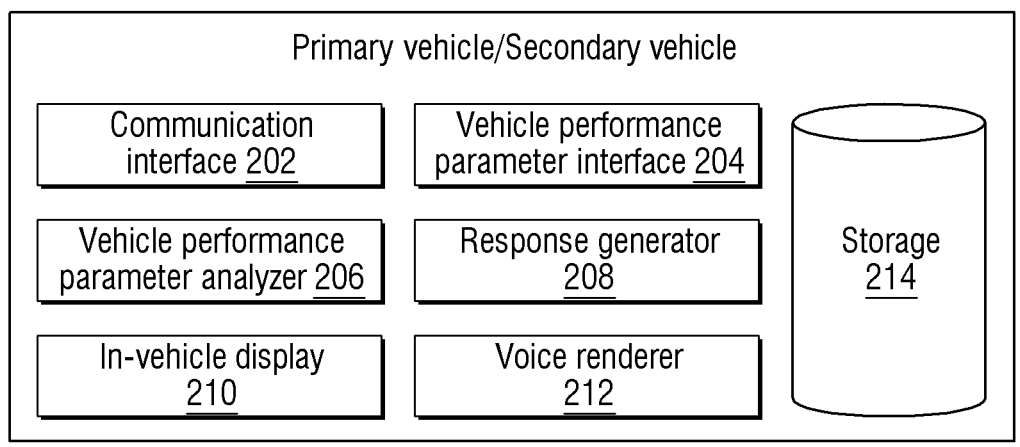
FIG. 2 is a block diagram illustrating various components of a primary vehicle or a secondary vehicle according to an example embodiment.

FIG. 2 is a block diagram illustrating various components of the primary vehicle or the secondary vehicle according to an example embodiment. In an example embodiment, the primary vehicle or secondary vehicle may include a communication interface 202, a vehicle performance parameter receiver 204, a vehicle performance parameter analyzer 206, a response generator 208, an in-vehicle display 210, a voice renderer 212 and a storage (memory) 214. The communication interface 202 may detect the neighboring secondary vehicle in the vicinity to the primary vehicle. After detecting the neighboring secondary vehicle, the vehicle performance parameter receiver 204 may be configured to receive the vehicle performance parameter from the neighboring secondary vehicle.

In an example embodiment, the communication interface 202 of the secondary vehicle may send the vehicle performance parameter to the primary vehicle. After receiving the vehicle performance parameter, the vehicle performance parameter analyzer 206 is configured to relatively analyze the vehicle performance parameter. Based on analyzing the vehicle performance parameter, the response generator 208 is configured to provide the response. The vehicle performance parameter analyzer 206 and the response generator 208 may be implemented by one or more processors.

In an example embodiment, the in-vehicle display 210 may display the response. In an example embodiment, the voice renderer 212 provides the response in an audio format.

The storage 214 is configured to store the analyzed response. In an example embodiment, the vehicle performance parameter exchanged among vehicles may be stored in the storage 214.

Although FIG. 2 shows exemplary components of the primary vehicle or the secondary vehicle, example embodiments are not limited thereto. The primary vehicle or the secondary vehicle may include fewer components, different components, differently arranged components, or additional components than illustrated as an example in the FIG. 2. Additionally or alternatively, one or more components of the primary vehicle or the secondary vehicle may perform functions described as being performed by one or more other components of the primary vehicle or the secondary vehicle.

Figure 3:
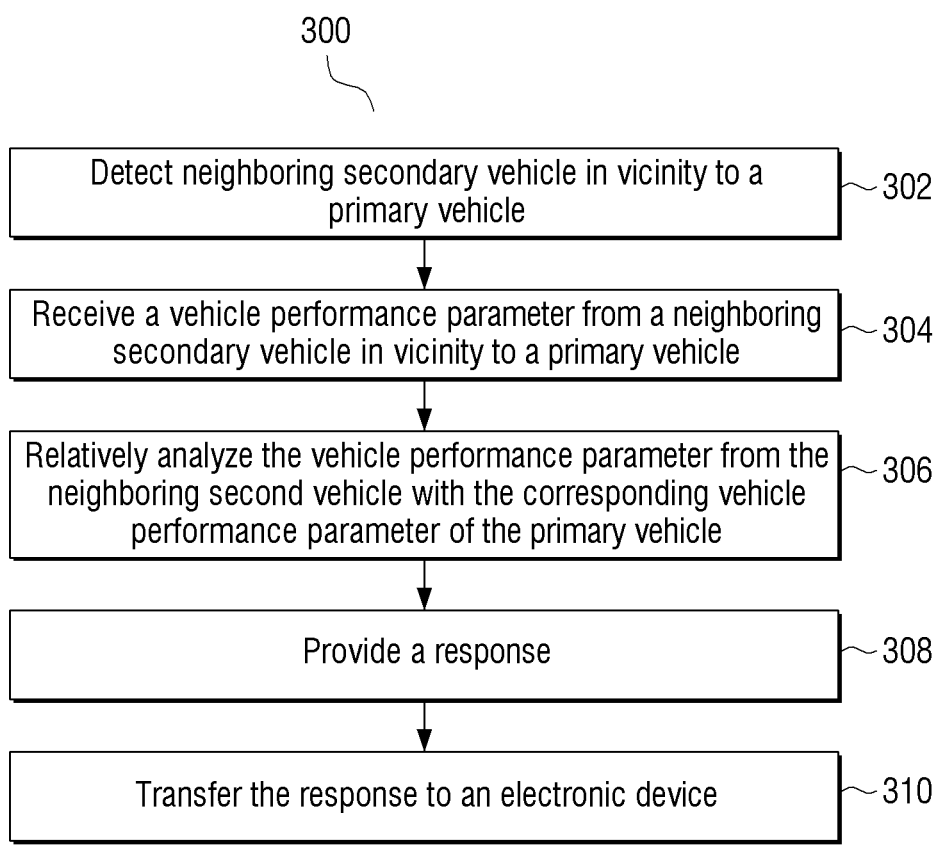
FIG. 3 is flow chart illustrating a method for exchanging the vehicle performance information according to an example embodiment.

FIG. 3 is flow chart 300 illustrating a method for exchanging the vehicle performance information according to an example embodiment. At operation 302, the method includes detecting the neighboring secondary vehicle in vicinity to the primary vehicle. For example, the method allows the communication interface 202 of the primary vehicle to detect the neighboring secondary vehicle in the vicinity to the primary vehicle. In an example, a Wi-Fi modem of the primary vehicle may detect the neighboring secondary vehicle in the vicinity to the primary vehicle. Similarly, any other short range or long range communication may be used to detect a neighboring secondary vehicle in the vicinity. At operation 304, the method includes receiving the vehicle performance parameter from the neighboring secondary vehicle. For example, the method includes allowing the vehicle performance parameter receiver 204 of the primary vehicle to receive the vehicle performance parameter from the neighboring secondary vehicle. In an example, the Wi-Fi modem of the primary vehicle may receive the vehicle performance parameter from the neighboring secondary vehicle. At operation 306, the method includes relatively analyzing the vehicle performance parameter from the neighboring secondary vehicle with the corresponding vehicle performance parameter of the primary vehicle. For example, the method includes allowing the vehicle performance parameter analyzer 206 of the primary vehicle to relatively analyze the vehicle performance parameter from the neighboring secondary vehicle with the corresponding vehicle performance parameter of the primary vehicle.

At operation 308, the method includes providing the response. For example, the method includes allowing the response generator 208 to provide the response. In an example embodiment, the response may be provided to the user of the primary vehicle. At operation 310, the method includes transferring the response to an electronic device. For example, the method includes allowing the communication interface 202 to transfer the response to an electronic device.

In an example, the Wi-Fi modem of the primary vehicle may transfer the response to the electronic device. The response can be, for example, a travel direction related information or the like.

The various actions, acts, blocks, operations, and the like in the flow chart 300 may be performed in the order presented, in a different order or simultaneously. Further, in example embodiments, some actions, acts, blocks, operations, and the like may be omitted, added, modified, skipped, and the like without departing from the scope of the present disclosure.

Figure 4:
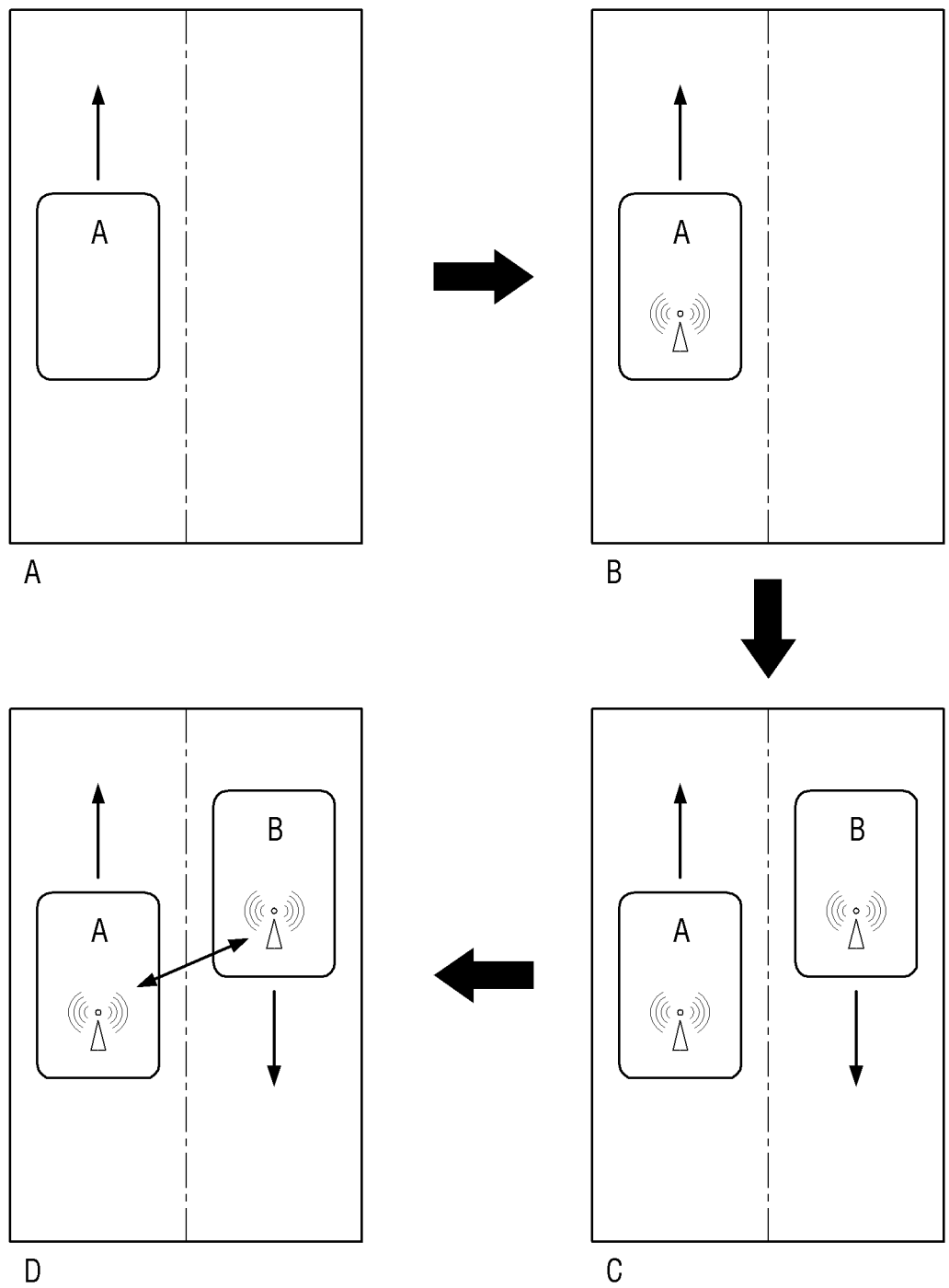
FIG. 4 progressively shows exchange of vehicle performance information between vehicles according to an example embodiment.

FIG. 4 progressively shows exchange of the vehicle performance information between vehicles according to an example embodiment. Initially, the primary vehicle (vehicle A) moves in a direction as shown in diagram A. The primary vehicle may enable the communication interface as shown in diagram B. As shown, the secondary vehicle (vehicle B) may move in a direction opposite to the primary vehicle direction as shown in the diagram C. The secondary vehicle may also enable the communication interface. When the primary vehicle detects the neighboring secondary vehicle in the vicinity, the primary vehicle and the neighboring secondary vehicle may exchange the vehicle performance parameter depicted in diagram D.

Figure 5:
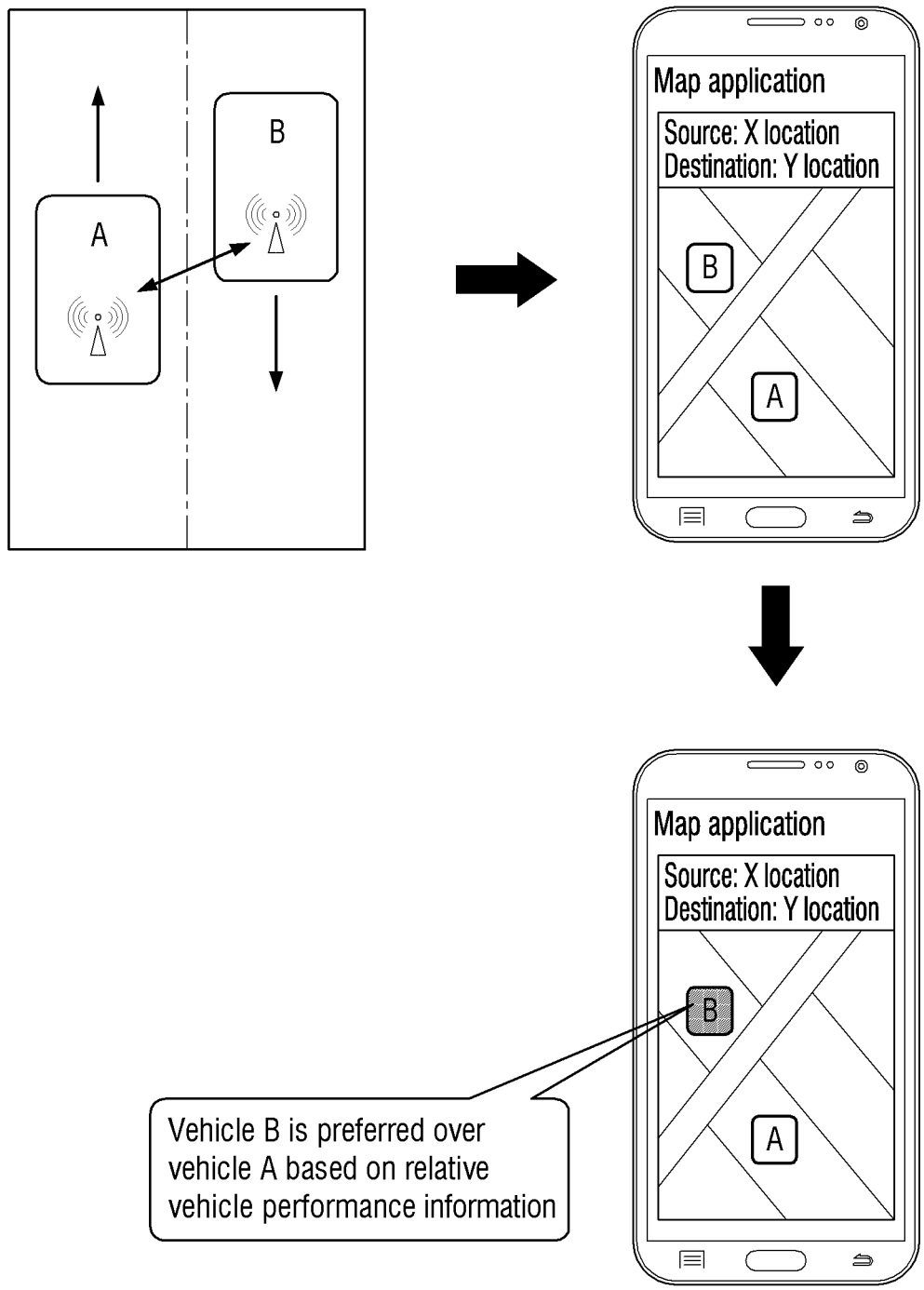
FIG. 5 shows an example illustration of selection of the vehicle on a vehicle booking application based on the shared vehicle performance information according to an example embodiment.

FIG. 5 shows an example illustration of selection of the vehicle on a vehicle booking application based on the shared vehicle performance information according to an example embodiment. For example, when the user of the smart phone wants to book a cab to a destination, while booking the cab on an application, the application with aid of the GPS may provide the vehicles in the vicinity of the present location of the user in accordance to the response generated with exchanged/received vehicle performance parameter from one or more other vehicles. In an example, road conditions between the source and destination, engine conditions of the cab, weather in the destination may be considered separately or in combination to suggest a vehicle to reach the destination. Based on the suggestion, the user of the electronic device may book a cab. In an example, the suggested cab, such as vehicle B, may be presented in a predetermined color to the user among plurality of cabs in the vicinity of the present location of the user.

FIG. 6 is an example illustrating comparison of the vehicle performance information of two vehicles according to an example embodiment. The vehicle performance parameter exchanged between the vehicles may be presented in the table. The table includes vehicle performance parameter such as price of the vehicle (on-road), tank capacity, and model. In an example embodiment, the method includes relatively analyzing these parameters to provide suggestions to a user to buy a vehicle that satisfies the user's requirements. Alternatively, the table may be displayed to the user to analyze the vehicle performance parameter (e.g., model, price, and tank capacity) of the own vehicles and the corresponding vehicle performance parameter of the other vehicles. This helps the user to decide to purchase a vehicle that satisfies the user's requirements.

FIG. 7 is an example illustration of displaying a message, such as work shop related information, on the in-vehicle display 210 of the vehicle based on shared vehicle performance information according to an example embodiment. Based on the shared vehicle performance information, the vehicle may relatively analyze the workshop related information (e.g., service quality, price, time, equipment used for the services, delivery or the like) received from other vehicles along with past workshop service related information. With the result of the analysis, the vehicle may identify the best or suitable workshop service and may provide the suggestion on the in-vehicle display 210 to the user. This may help the user in choosing the best or suitable workshop for a vehicle service.

Figure 8:
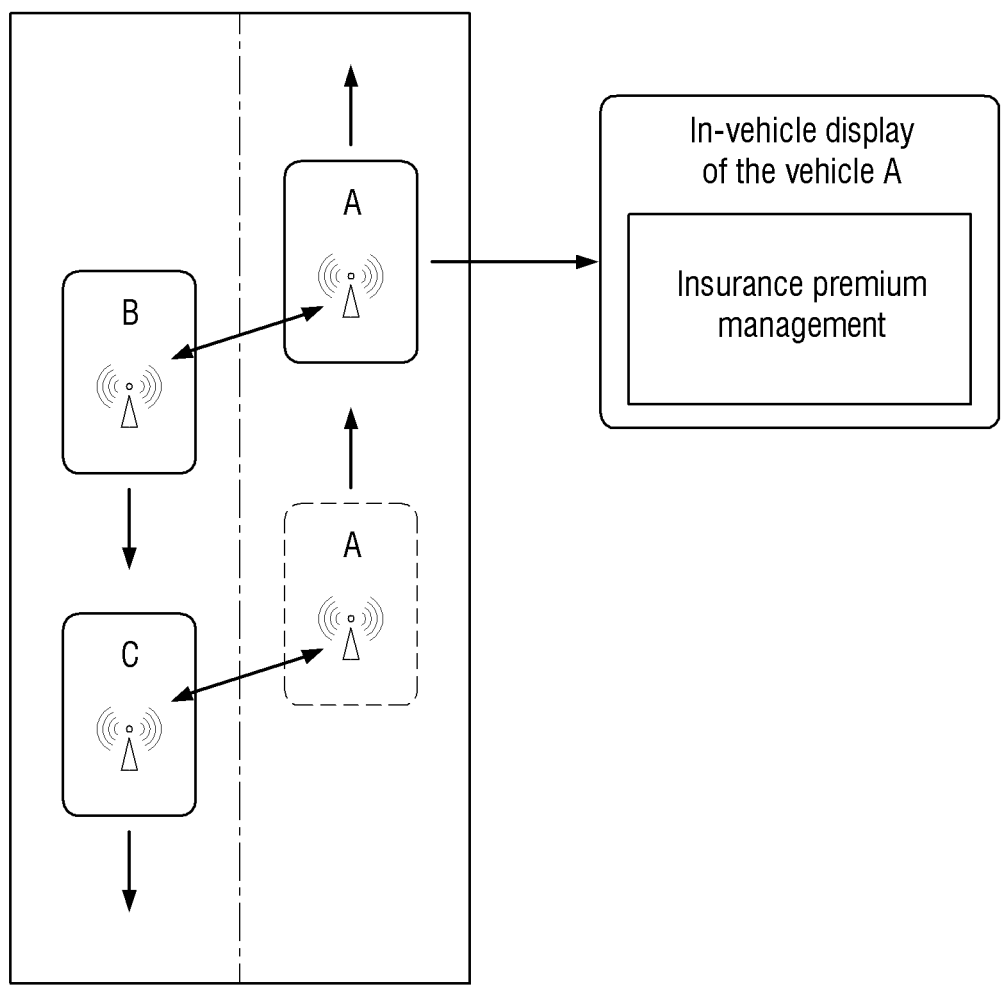
FIG. 8 is an example illustration of displaying a message on the in-vehicle display of a vehicle based on shared vehicle performance information among the vehicles according to an example embodiment.

FIG. 8 is an example illustration of displaying the message, such as insurance premium management related information, on the in-vehicle display 210 of the vehicle based on the shared vehicle performance information among the vehicles according to an example embodiment. Based on the shared vehicle performance information, the vehicle may relatively analyze the maintenance scores. The maintenance score may be associated with a vehicle usage pattern. Based on the analyzing of the maintenance scores, the in-vehicle display 210 may display, for example, the insurance premium management related information.

In an example embodiment, based on the shared vehicle performance information, the vehicle may relatively analyze the insurance provider related information (e.g., premium, deductible, coverage term, coverage amount, or the like) received from other vehicles with past insurance premium related information. Based on the analysis of the insurance related information, the vehicle may identify the best or more suitable insurance provider. Further, the vehicle may display the best insurance provider on the in-vehicle display 210 to the user, which may help the user to decide on the insurance provider.

In an example embodiment, the best or suitable insurance provider may be determined by comparing offers provided by an insurance premium service provider (e.g., insurance company, financial institution, or the like). The offer related information may be received from, for example, a social networking site posted by friends, a premium service provider's site subscribed by the user of the vehicle or the like.

Figure 9:
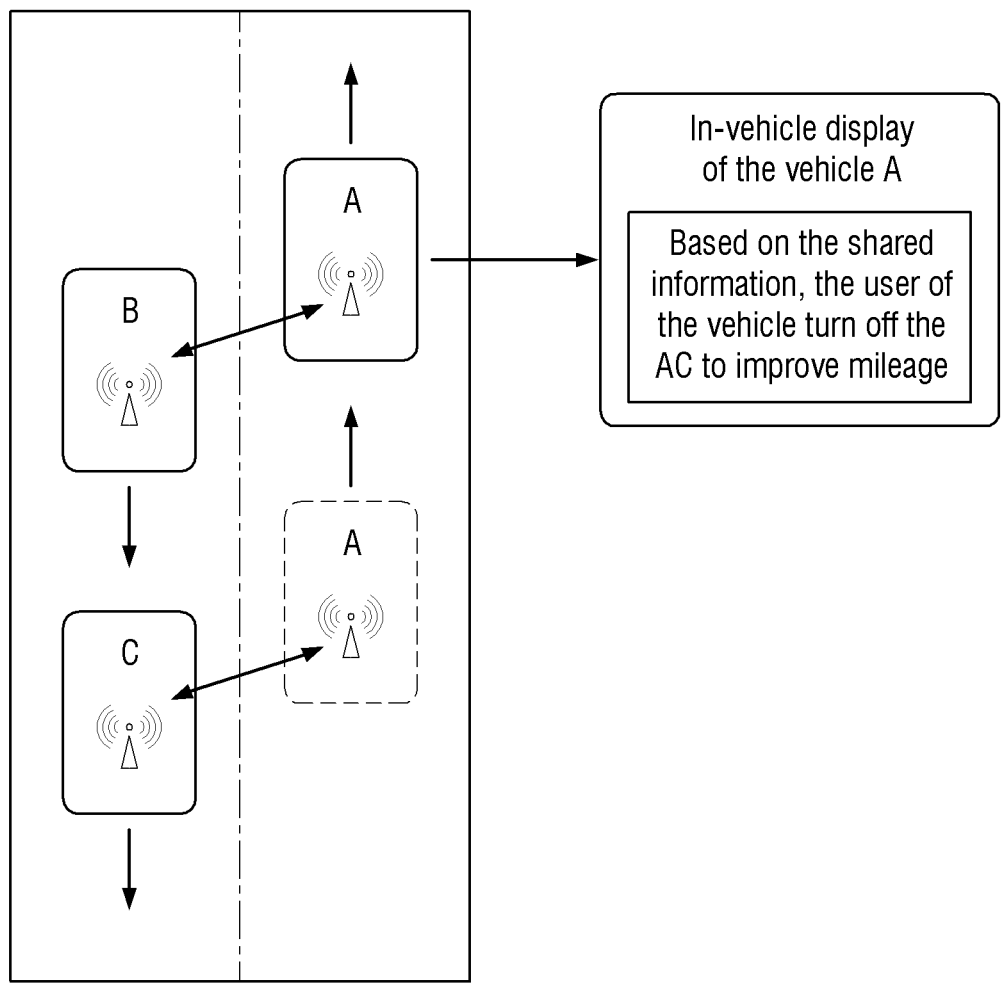
FIG. 9 is an example illustration of displaying a message on the in-vehicle display of a vehicle based on shared vehicle performance information among the vehicles according to an example embodiment.

FIG. 9 is an example illustration of displaying a message, such as mileage related information, on the in-vehicle display 210 of the vehicle based on the shared vehicle performance information among the vehicles according to an example embodiment. The user of the vehicle A may provide a destination in an application linked to the in-vehicle display 210. The vehicle A may relatively analyze the vehicle performance parameter corresponding to the destination in comparison with vehicle performance parameters of other vehicles in the vicinity. Accordingly, a response to the user to turn off the air conditioner in the in-vehicle display 210 to increase gas mileage while traveling to the destination may be presented. In an example, the vehicle performance parameter may be obtained from a server of the OEM such as engine temperature, tire pressure or the like to relatively analyze the same parameter with other vehicles in the vicinity to generate response. The response may be generated by analyzing the obtained vehicle performance parameters of other vehicles to provide suggestions to turn off air conditioning to increase gas mileage. In an example, the terrain to reach the destination may be obtained from a map application, and then the vehicle performance parameter may be relatively analyzed with other vehicles to generate a response. This may help the user to increase gas mileage of the vehicle A while traveling to the destination.

Figure 10:
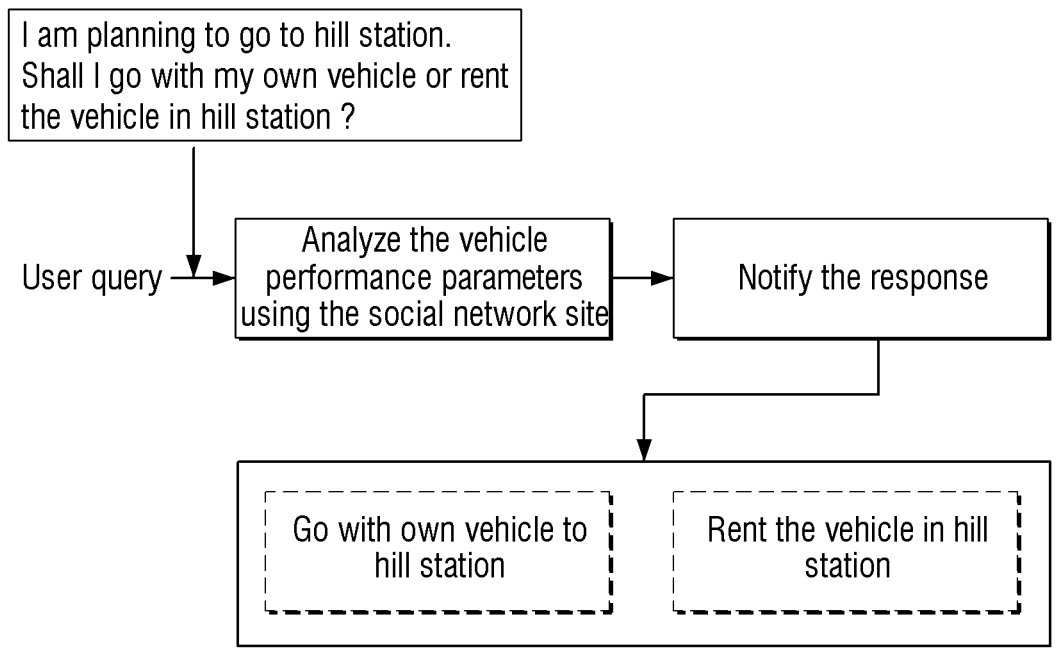
FIGS. 10 and 11 are example illustrations in which the user of the vehicle selects a vehicle based on the vehicle performance information according to an example embodiment.
Figure 11:
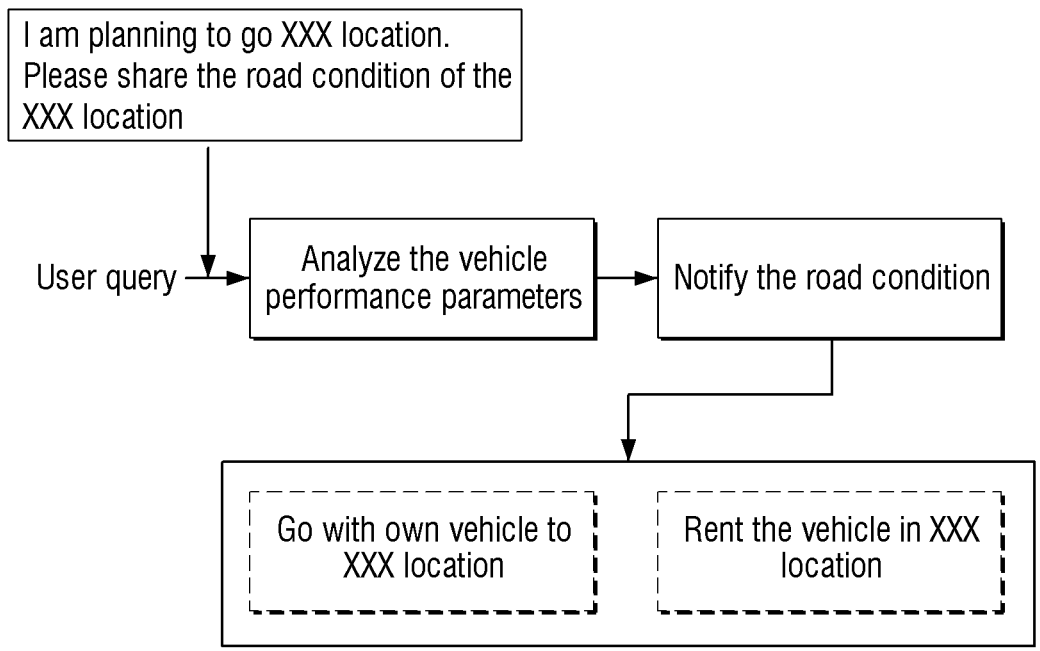

FIG. 10 to FIG. 11 are example illustrations in which a user of a vehicle selects the suitable vehicle based on the vehicle performance information according to example embodiments. As shown in the FIG. 10, a user of a vehicle may input a query, for example, "I am planning to go trip to a hill station, shall I go with my own vehicle or rent the vehicle in the hill station?" to the in-vehicle display 210. Based on the query, the vehicle performance parameter may be analyzed using social network sites. The vehicle performance parameter may be related to an external factor which may be related to weather conditions of the road, historical occurrences of incidents (e.g., vehicular accidents) on the road, and other factors related to the environment/surroundings in which the vehicle is operated. Based on the analysis, the in-vehicle display 210 may notify a response, for example, "go with my own vehicle to hill station" or "rent a vehicle in hill station".

As shown in the FIG. 11, the user of the vehicle may input a query, for example, "I am planning to go to XXX location. Please share the road condition of the XXX location" to the in-vehicle display 210. Based on the query, the vehicle performance parameter may be analyzed based on the received vehicle performance information from other vehicles. The vehicle performance parameter may be related to, for example, the road condition of the XXX location and engine capacity in the XXX location. Based on the analysis, the in-vehicle display 210 may notify a response, for example, "go with own vehicle to XXX location" or "rent a vehicle in XXX location".

In an example embodiment, the user of a vehicle may input a query, for example, "I am planning to go XXX location. Please share the road condition of the XXX location" to the in-vehicle display 210. Based on the query, the vehicle performance parameter may be analyzed based on the received vehicle performance information from other vehicles. The vehicle performance parameter may be related to, for example, the road condition of the XXX location and tire pressure in the XXX location. Based on the analysis, the in-vehicle display 210 may notify a response, for example, "go with own vehicle to XXX location" or "increase the tire pressure level".

In an example embodiment, when relocating to a new location, an owner of a vehicle may decide to take his or her current vehicle to the new location or sell the vehicle and purchase a new vehicle at the new location based on the average relative performance of vehicle at the new location the owner is moving to in comparison with the current status of his or her current vehicle.

In an example embodiment, based on the analysis of the vehicle performance information, the owner of the vehicle may decide that low turning radius of the vehicle helps driving through a city traffic.

In an example embodiment, based on the analysis of the vehicle performance information, the driver of the vehicle may identify that smaller braking distance reduces the risk of collision in a hilly region.

In an example embodiment, based on the analysis of the vehicle performance information, a user of the vehicle may identify that lower ground clearance allows better handling and provides higher performance on a smooth road surface.

Figure 12:
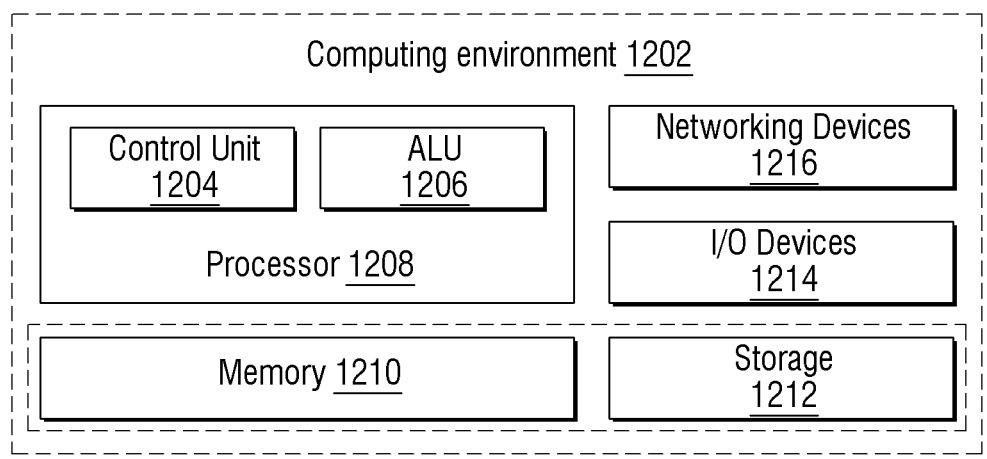
FIG. 12 illustrates a computing environment implementing a mechanism for exchanging the vehicle performance information according to an example embodiment.

FIG. 12 illustrates a computing environment 1202 implementing a mechanism for exchanging the vehicle performance information according to example embodiments. The computing environment 1202 may include at least one processor 1208 that is equipped with a control unit 1204, an arithmetic logic unit (ALU) 1206, a memory 1210, a storage (memory) 1212, a plurality of networking devices 1216 and a plurality input/output (I/O) devices 1214. The processor 1208 may be configured to process the instructions for sharing vehicle performance information among vehicles according to example embodiments. The processor 1208 may be configured to receive commands from the control unit 1204 in order to perform its processing. Further, any logical and arithmetic operations involved in the execution of the instructions may be computed by the ALU 1206.

The overall computing environment 1202 may be composed of multiple homogeneous or heterogeneous cores, multiple central processing units (CPUs) of different kinds, special media and other accelerators. The processor 1208 may be configured to process the instructions for sharing vehicle performance information among vehicles according to example embodiments. Further, the plurality of processors 1204 may be located on a single chip or over multiple chips.

The instructions and codes required for the implementation of sharing vehicle performance information among vehicles according to example embodiments may be stored in either the memory 1210 or the storage 1212 or both. At the time of execution, the instructions may be fetched from the corresponding memory 1210 or storage 1212, and executed by the processor 1208.

In case of any hardware implementations, various networking devices 1216 or external I/O devices 1214 may be connected to the computing environment 1202 to support the implementation through the networking unit and the I/O device unit.

The example embodiments disclosed herein may be implemented through at least one software program running on at least one hardware device and performing network management functions to control the elements. The elements shown in the FIGS. 2, 12, and 13 include blocks which can be at least one of a hardware device, or a combination of hardware device and software module.

In the example embodiment described above, a vehicle may receive vehicle performance information directly from an external vehicle, analyze the received vehicle performance information, and provide a response, but example embodiments are not limited thereto. An electronic apparatus included in a vehicle may receive vehicle performance information from an external vehicle, analyze the received vehicle performance information, and provide a response. For example, an electronic apparatus may be a control apparatus for controlling a vehicle, a smart phone, a laptop, a PDA, a tablet computer or the like. In addition, the electronic apparatus may be connected to the vehicle physically or electrically, and may be connected to an external vehicle or an electronic apparatus provided in the external vehicle.

Figure 13:
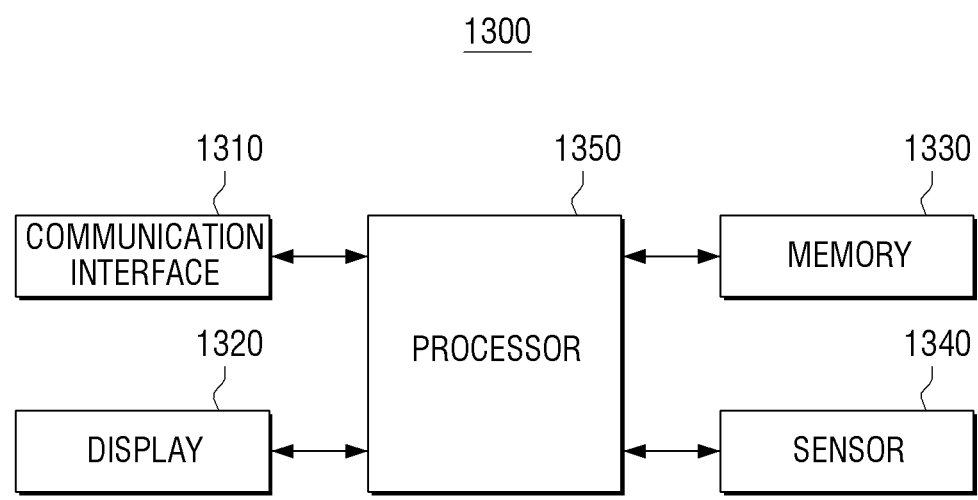
FIG. 13 is a block diagram illustrating an example configuration of an electronic apparatus according to an example embodiment.

FIG. 13 is a block diagram illustrating a configuration of an electronic apparatus according to an example embodiment. As illustrated in FIG. 13, an electronic apparatus (1300) may include a communication interface (1310), a display (1320), a memory (1330), and a sensor (1340). In this regard, the electronic apparatus 100 may be an electronic apparatus which may be provided in a vehicle, and may be connected to the vehicle physically or electrically. Meanwhile, the features illustrated in FIG. 13 are merely examples to implement the example embodiments of the present disclosure, and appropriate hardware or software features may be additionally included in the electronic apparatus 1300.

The communication interface 1310 may communicate with an external electronic apparatus or an external vehicle. In other words, the communication interface 1310 may communicate with a vehicle provided with the electronic apparatus 1300 or with the external vehicle, and may communicate with the electronic apparatus provided in the external vehicle.

In particular, the communication interface 1310 may receive vehicle performance parameter of an external vehicle from the external vehicle or an electronic apparatus included in the external vehicle.

In addition, the communication interface 1310 may output the response acquired by analyzing vehicle performance parameter of the vehicle with vehicle performance parameter of the external vehicle, to the vehicle.

The display 1320 may output a response acquired by analyzing a vehicle performance parameter of a vehicle with a vehicle performance parameter of an external vehicle. In particular, the display 1320 may output a notification acquired based on a result of the analysis.

The memory 1330 may store various programs and data for controlling the electronic apparatus 100. In addition, the memory 1330 may store vehicle performance parameter acquired from the vehicle.

The sensor 1340 may detect vehicle performance parameter of the vehicle. For example, the sensor 1340 may acquire vehicle performance parameter of the vehicle through various sensors such as a motion sensor, a camera, an approximate sensor, and the like.

The processor 1350 may be connected to the communication interface 1310, the display 1320, the memory 1330, and the sensor 1340 to control overall operations of the electronic apparatus 1300.

In particular, the processor 1350 may receive, via the communication interface 1310, vehicle performance parameter of the external vehicle from the external vehicle, and may relatively analyze vehicle performance parameter of the external vehicle with vehicle parameter of the vehicle provided with the electronic apparatus 1300, and provide a response based on the analysis result. In this regard, the vehicle performance parameter may include at least one from among a component associated with a vehicle, an attribute associated with a component, an external factor influencing a vehicle, and a maintenance score associated with a vehicle.

In particular, in response to a user query being received, the processor 1350 may receive, via the communication interface 1310, vehicle performance parameter of an external vehicle from the external vehicle, may analyze a vehicle performance parameter corresponding to the user query from among the vehicle performance parameter of the external vehicle, and may provide a response corresponding to the user query. For example, in response to a user query inquiring about a gas station being received, the processor 1350 may provide a response to the user query based on information associated with a gas station, for example, mileage of an external vehicle, manufacturer, information about the gas station from which the user fueled, and the like, from among the vehicle performance parameter of the external vehicle.

In addition, the processor 1350 may control the communication interface 1310 to transmit the acquired vehicle performance parameter to an external entity. In this regard, the external entity may be, for example, social media, a dedicated server monitoring vehicle performance information of vehicles in a city/state, a cloud server with vehicle information of vehicles and the like.

In particular, the processor 1350 may receive, from an external entity, various responses acquired by analyzing a vehicle performance parameter via the communication interface 1310.

In addition, the processor 1350 may analyze vehicle performance parameter based on a present position and/or a driving direction of the vehicle. In other words, the processor 1350 may analyze the vehicle performance parameter based on a driving direction of the vehicle and a position of the vehicle.

In addition, the processor 1350 may provide a response acquired based on the analysis result, via the display 1320. In particular, the processor 1350 may provide a proposal to control an external device (e.g., engine of a vehicle) generated based on the analysis result via the display 1320.

In addition, the processor 1350 may obtain information related to the driver of the external vehicle, via the communication interface 1310, in addition to the vehicle performance parameter of the external vehicle from the external vehicle.

The processor 1350 may obtain information related to driving characteristics with regard to the driver of the external vehicle based on a parameter related to driving habits among vehicle performance parameters of the external vehicle and the driver information. The information related to the driving habits may include information such as the number of times of sudden start/sudden braking, braking distance, fuel efficiency, etc., and the driver information may include information such as driving experience, age, gender, drunk driving record, accident record, etc.

The processor 1350 may generate a response based on information related to the driving characteristics and provide the user with the response. For example, if it is determined that the vehicle performance parameter of the external vehicle in front of the vehicle is higher, but the driver information of the external vehicle indicates that the driver has a history of suddenly stopping the vehicle when driving and a braking distance is shorter, the processor 1350 may generate a response to increase a safety distance or to decrease a driving speed according to the driving characteristics of the external vehicle and provide the response. In an example, if it is determined that the driving experience of the external vehicle in front of the vehicle is less than a predetermined period, the processor 1350 may generate a response to increase a safety distance or decrease a driving speed in consideration of the driver information of the external vehicle and provide the response.

The above-described methods may be realized as program instructions which are executable by diverse computer systems and recorded in a non-transitory computer readable medium. The non-transitory computer readable medium may include program instructions, data files, and data structures or combinations thereof. The program instructions recorded in the medium may be specially designed and configured for the present disclosure or may have been publicly known and available to a person having ordinary skill in the computer software field. The non-transitory computer readable medium may include a hardware device which is specially configured to store and execute program instructions, such as, magnetic mediums including a hard disk, a floppy disk, or a magnetic tape, optical mediums including a compact disc read-only memory (CD-ROM) or a digital versatile disk (DVD), magneto-optical mediums including a floptical disk, a read-only memory (ROM), a random access memory (RAM), and a flash memory. The program instructions may include a high-level language code which is executable by a computer by using an interpreter as well as a machine language code generated by a compiler, for example. The hardware device may be configured to operate as one or more software modules in order to perform the operations of the present disclosure, and vice versa.

Further, the above-described methods according to the example embodiments disclosed herein may be provided as computer program products. The computer program products may include a software program, a recording medium which is readable by a computer with a software program, or a product transacted between a seller and a buyer.

For example, the computer program products may include a product in a form of a software program (for example, a downloadable application) which is electrically distributed through the electronic apparatus 100, a manufacturer of the electronic apparatus 100, or an e-market (for example, Google Play Store or App Store). For the electrical distribution, at least some of the software program may be stored in a recording medium or may be temporarily generated. In this case, the recording medium may be a recording medium of a server of the manufacturer or the e-market or a recording medium or a relay server.

While example embodiments have been shown and described, it will be understood by those skilled in the art that various changes in form and details may be made therein without departing from the spirit and scope of the present disclosure as defined by the appended claims and their equivalents.

What is claimed is:

1. An electronic apparatus provided in a vehicle, the electronic apparatus comprising:
   a communication interface;
   a memory;
   a processor connected to the communication interface and the memory,
   wherein the processor is configured to execute processor-executable instructions stored in the memory to:
   receive at least one vehicle performance parameter of an external vehicle from the external vehicle via the communication interface in response to a user query for getting to a destination being received by the electronic apparatus;
   analyze the at least one vehicle performance parameter of the external vehicle corresponding to the user query in comparison with a vehicle performance parameter of the vehicle based on a location of the vehicle and information related to the destination; and
   provide a response based on a result of the analysis.

2. The electronic apparatus as claimed in claim 1, wherein the at least one vehicle performance parameter comprises at least one from among a component associated with the external vehicle, an attribute associated with the component associated with the external vehicle, an external factor influencing the external vehicle, and a maintenance score associated with the external vehicle.

3. The electronic apparatus as claimed in claim 1, wherein the processor is further configured to provide the response corresponding to the user query.

4. The electronic apparatus as claimed in claim 1, wherein the processor is further configured to retrieve the at least one vehicle performance parameter from an external entity.

5. The electronic apparatus as claimed in claim 1, wherein the processor is further configured to analyze the at least one vehicle performance parameter based on at least one from among a position and a driving direction of the vehicle.

6. The electronic apparatus as claimed in claim 1, wherein the electronic apparatus further comprises a display, and
   wherein the processor is further configured to provide the response via the display.

7. The electronic apparatus as claimed in claim 6, wherein the processor is further configured to generate a notification to control an external device based on the result of the analysis, and provide the notification via the display.

8. The electronic apparatus as claimed in claim 1, wherein the processor is further configured to receive driver information of a driver of the external vehicle via the communication interface, and provide the response based on at least one from among information corresponding to driving habits of the driver of the external vehicle among the at least one vehicle performance parameter and the driver information of the external vehicle, and wherein the driving habits comprises at least one from among information of a number of times of sudden start and sudden brake, information of braking distance, information of fuel efficiency, and the driver information comprises at least one from among driving experience of the driver, age of the driver, gender of the driver, drunk driving record of the driver, and accident record of the driver.

9. A method of controlling an electronic apparatus provided in a vehicle, the method comprising:

receiving at least one vehicle performance parameter of an external vehicle from the external vehicle via a communication interface of the electronic apparatus in response to a user query for getting to a destination being received;

analyzing, by a processor of the electronic apparatus, the at least one vehicle performance parameter of the external vehicle corresponding to the user query in comparison with a vehicle performance parameter of the vehicle stored in a memory of the electronic apparatus based on a location of the vehicle and information related to the destination; and providing a response based on a result of the analyzing.

10. The method as claimed in claim 9, wherein the at least one vehicle performance parameter comprises at least one from among a component associated with the external vehicle, an attribute associated with the component associated with the external vehicle, an external factor influencing the external vehicle, and a maintenance score associated with the external vehicle.

11. The method as claimed in claim 9, wherein the providing further comprises providing the response corresponding to the user query based on the result of analyzing the vehicle performance parameter corresponding to the user query.

12. The method as claimed in claim 9 further comprising retrieving at least one vehicle performance parameter from an external entity.

13. The method as claimed in claim 9, wherein the analyzing comprises analyzing the at least one vehicle performance parameter based on at least one from among a present position of the vehicle and a driving direction of the vehicle.

14. The method as claimed in claim 9, wherein the providing further comprises providing the response based on the result of the analyzing via a display.

15. The method as claimed in claim 14, wherein the providing further comprises generating a notification to control an external device based on the result of the analyzing, and providing the notification via the display.

16. The method as claimed in claim 9, wherein the receiving further comprises receiving driver information of a driver of the external vehicle along with the at least one vehicle performance parameter, and wherein the providing further comprises providing the response based on information corresponding to driving habits of the driver of the external vehicle among the at least one vehicle performance parameter and the driver information of the driver of the external vehicle, and wherein the driving habits comprises at least one from among information of a number of times of sudden start and sudden brake, information of braking distance, information of fuel efficiency, and the driver information comprises at least one from among driving experience of the driver, age of the driver, gender of the driver, drunk driving record of the driver, and accident record of the driver.

17. The electronic apparatus as claimed in claim 1, wherein the memory is configured to store the at least one vehicle performance parameter of the external vehicle received from the external vehicle.

18. The electronic apparatus as claimed in claim 4, wherein the external entity comprises a social network service and a cloud server.

* * * * *